(12) United States Patent
Stanforth et al.

(10) Patent No.: US 8,576,817 B2
(45) Date of Patent: Nov. 5, 2013

(54) SYSTEM AND METHOD FOR MANAGING RADIO ACCESS TO SPECTRUM AND TO A SPECTRUM MANAGEMENT SYSTEM

(75) Inventors: Peter Stanforth, Winter Springs, FL (US); Sekhar V. Uppalapati, Longwood, FL (US); Jeffrey C. Schmidt, Orlando, FL (US); Mario Camchong, Oviedo, FL (US)

(73) Assignee: Spectrum Bridge, Inc., Lake Mary, FL (US)

( * ) Notice: Subject to any disclaimer, the term of this patent is extended or adjusted under 35 U.S.C. 154(b) by 834 days.

(21) Appl. No.: 12/756,581

(22) Filed: Apr. 8, 2010

(65) Prior Publication Data
US 2011/0250915 A1 Oct. 13, 2011

(51) Int. Cl.
*H04W 4/00* (2009.01)

(52) U.S. Cl.
USPC .......................................... 370/338

(58) Field of Classification Search
USPC ......... 370/203, 204–215, 229–240, 310–337, 370/338–350, 351–394, 395.1, 395.3, 370/395.4, 395.41, 395.42, 395.5, 395.52, 370/395.53, 412–421, 431–457, 458–463, 370/464–497, 498–522, 523–520, 521–529
See application file for complete search history.

(56) References Cited

U.S. PATENT DOCUMENTS

| | | | |
|---|---|---|---|
| 5,608,727 A | 3/1997 | Perreault et al. | |
| 5,729,531 A | 3/1998 | Raith et al. | |
| 5,796,785 A | 8/1998 | Spiero | |
| 6,954,171 B2 | 10/2005 | Husted et al. | |
| 7,088,997 B1 | 8/2006 | Boehmke | |
| 7,110,756 B2 | 9/2006 | Diener | |
| 7,349,880 B1 | 3/2008 | Kitao | |
| 7,460,837 B2 | 12/2008 | Diener | |
| 8,326,313 B2 * | 12/2012 | McHenry et al. | 455/454 |
| 2002/0019965 A1 | 2/2002 | Bims et al. | |
| 2003/0050070 A1 | 3/2003 | Mashinsky et al. | |
| 2006/0031082 A1 | 2/2006 | Amaitis et al. | |
| 2006/0083205 A1 | 4/2006 | Buddhikot et al. | |
| 2006/0143111 A1 | 6/2006 | Mylet | |
| 2006/0218392 A1 | 9/2006 | Johnston | |
| 2006/0234713 A1 | 10/2006 | Oswal et al. | |
| 2007/0032254 A1 | 2/2007 | Chen | |
| 2007/0106596 A1 | 5/2007 | Bayyapu et al. | |
| 2007/0274404 A1 | 11/2007 | Papandriopoulos et al. | |
| 2008/0052387 A1 | 2/2008 | Heinz et al. | |
| 2008/0108365 A1 | 5/2008 | Buddhikot et al. | |

(Continued)

OTHER PUBLICATIONS

Jones, Steven K. et al., "Initial Evaluation of the Performance of Prototype TV-Band White Space Devices", (2007), OET Report, FCC/OET 07-TR-1006.
47 C.F.R. 15.713.

(Continued)

*Primary Examiner* — Jung-Jen Liu
(74) *Attorney, Agent, or Firm* — Renner, Otto, Boisselle & Sklar, LLP (57) ABSTRACT

A communication system where radios without a normally available communication pathway to a spectrum management system (referred to as spoke radio devices) communicate with the spectrum management system by joining a network established by a hub radio device that has a prior registration with the spectrum management system. Once joined, the spoke may seek registration with the spectrum management system and, if appropriate, obtain a spectrum allocation from the spectrum management system. Also, once registered, spoke radio devices may form a network of their own.

23 Claims, 5 Drawing Sheets

(56) References Cited

U.S. PATENT DOCUMENTS

| | | |
|---|---|---|
| 2008/0130519 A1 | 6/2008 | Bahi et al. |
| 2008/0151743 A1 | 6/2008 | Tong et al. |
| 2008/0183634 A1 | 7/2008 | Sadler |
| 2008/0186882 A1 | 8/2008 | Scherzer et al. |
| 2008/0221951 A1 | 9/2008 | Stanforth et al. |
| 2008/0222019 A1 | 9/2008 | Stanforth et al. |
| 2008/0222021 A1 | 9/2008 | Stanforth et al. |
| 2009/0046625 A1 | 2/2009 | Diener et al. |
| 2009/0197627 A1 | 8/2009 | Kuffner et al. |
| 2010/0075704 A1 | 3/2010 | Mchenry et al. |
| 2010/0105332 A1* | 4/2010 | McHenry et al. ............... 455/62 |
| 2010/0255794 A1* | 10/2010 | Agnew ............................ 455/77 |
| 2011/0090890 A1* | 4/2011 | Seok et al. .................... 370/338 |
| 2012/0208558 A1* | 8/2012 | Bajko et al. ................ 455/456.1 |

OTHER PUBLICATIONS

Kwerel, Evan et al., "A Proposal for a Rapid Transition to Market Allocation of Spectrum", Federal Communications Commission, 2002, OPP Working Paper No. 38, pp. 1-50.

By the Commission, "Second Report and Order, Order on Reconsideration, and Second Further Notice of Proposed Rulemaking", Federal Communications Commission, 2004, FCC 04-167, pp. 1-180.

McKnight, Lee et al., "Best Effort versus Spectrum Markets: Wideband and Wi-Fi versus 3G MVNOs?", pp. 1-18.

Prabhu, Krish et al., "Time for Action" Genuine Ideas, 2002, [retrieved online Feb. 1, 2008], <http://www.genuineideas.com/ArticlesIndex/TimeForAction.htm>.

FCC 08-260, Second Report and Order and Memorandum Opinion and Order, Adopted Nov. 4, 2008 and Released Nov. 14, 2008.

"Digital Dividend: Cognitive Access, Consultation on License-Exempting Cognitive Devices using Interleaved Spectrum", Ofcom, Publication Date: Feb. 16, 2009.

U.S. Spectrum Management Policy: Agenda for the Future, 1991.

Radio Spectrum Management, Module 5 of ICT Regulation Toolkit, ITU, 2007.

International Search Report and Written Opinion from corresponding International Application No. PCT/US11/31740.

* cited by examiner

SYSTEM AND METHOD FOR MANAGING RADIO ACCESS TO SPECTRUM AND TO A SPECTRUM MANAGEMENT SYSTEM

TECHNICAL FIELD OF THE INVENTION

The technology of the present disclosure relates generally to wireless communications infrastructure and, more particularly, to a system and method for facilitating radio access to spectrum and for facilitating communication between a radio and a spectrum management system.

BACKGROUND

Wireless networks and systems are becoming increasingly popular. But wireless communications are constrained due to a lack of available, interference free spectrum that may be used for reliable communications within a geographic area.

To enhance the availability and reliability of interference free spectrum, procedures that are governed by regulatory agencies (e.g., the Federal Communications Commission (FCC) in the United States) have been developed for allocating and governing spectrum use. In the U.S., for example, there are two general classes of spectrum, including licensed spectrum and unlicensed spectrum. With respect to the licensed spectrum, the FCC licenses spectrum in a primary spectrum market to Commission licensees. A secondary market exists for the Commission licensees to sublease spectrum for use by other parties. With some narrow exceptions (e.g., government priority rights), licensed spectrum is exclusively reserved for the corresponding Commission licensee and any subleasee(s).

Unlicensed spectrum may be used without a license and by virtually any party, but regulations on the spectrum may be imposed. Exemplary unlicensed spectrum includes industrial, scientific and medical (ISM) bands and information infrastructure (UNII) bands. These bands are open to all users provided the users comply with certain regulations. In the U.S., these regulations are known as FCC Part 15. Traditionally, these bands have been used for microwave ovens, cordless phones, low powered wireless remote controls, and similar devices. Recently, with the advent of IEEE 802.11 (commonly known as WiFi), these bands have become very popular for computer communications and mobile data communications activities, as well as for point-to-point and point-to-multipoint applications. As the number of installations and users of these applications has increased the unlicensed ISM and UNII spectrum bands have become very crowded.

Other unlicensed spectrum includes spectrum that has been freed by the conversion of analog television (TV) broadcasts to digital TV broadcasts. This conversion has freed spectrum channels for use by unlicensed radio systems to offer various services, such as mobile communications and Internet access. The available spectrum is commonly referred to as TV whitespace, which is made up of the guard bands and unused TV channels between channel 2 and channel 51 (corresponding to 54 MHz to 698 MHz). To avoid interference with digital TV broadcasts and other incumbent systems, such as wireless microphone systems, radios that use the TV whitespace are required to register and receive a channel map of available channels that may be used for the communications activity of the radio system. Current regulations require these radio systems to register every twenty-four hours. Also, for mobile radios, if the radio moves into a new location, a new registration is required. Other regulations on the radios are present, such as transmitted power limits for different types of radios. Additional information regarding the regulation of TV whitespace may be found in FCC 08-260, Second Report and Order and Memorandum Opinion and Order, Adopted Nov. 4, 2008 and Released Nov. 14, 2008, the entirety of which is incorporated herein by reference. Similar proposals have been made in places other than the United States. For example, Ofcom in the United Kingdom has described access to certain spectrum by cognitive radios in "Digital Dividend: Cognitive—Access Consultation on License-Exempting Cognitive Devices Using Interleaved Spectrum," published Feb. 16, 2009.

SUMMARY

In some scenarios, a remote radio may not have direct communication capability with a spectrum management system from which spectrum or a channel map may be obtained. Also, current channel map provisioning techniques do not readily support some communication topologies, such as point-to-point, point-to-multipoint and mesh infrastructure, where the involved radio devices would operate best using a common spectrum allocation.

The present disclosure describes a communication system where radios without a normally available communication pathway to a spectrum management system (referred to as spoke radio devices) may communicate with the spectrum management system by joining a network established by a hub radio device that has a prior registration with the spectrum management system. Once joined, the spoke may seek registration with the spectrum management system and, if appropriate, obtain a spectrum allocation from the spectrum management system. Also, once registered, spoke radio devices may form a network of their own.

According to one aspect of the disclosure, a method of radio communications using a hub radio device that forms part of a communication system, the communication system having a spectrum management system that allocates spectrum to radio devices in the communication system includes registering with the spectrum management system and receiving a spectrum allocation from the spectrum management system; broadcasting a beacon over an operating channel that is part of the spectrum allocation; joining a spoke radio device from which a join request is received; and acting as a communication pathway for communication between the spoke radio device and the spectrum management system for the spoke radio device to register with the spectrum management system.

According to another aspect of the disclosure, a method of radio communications using a spoke radio device that forms part of a communication system, the communication system having a spectrum management system that allocates spectrum to radio devices in the communication system includes scanning for and receiving a beacon that is broadcast by a hub radio device, the hub radio device being registered with the spectrum management system; joining with the hub radio device; and registering with the spectrum management system using the hub radio device as a communication pathway for communication with the spectrum management system.

These and further features will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

Features that are described and/or illustrated with respect to one embodiment may be used in the same way or in a similar way in one or more other embodiments and/or in combination with or instead of the features of the other embodiments.

DETAILED DESCRIPTION OF EMBODIMENTS

Embodiments will now be described with reference to the drawings, wherein like reference numerals are used to refer to like elements throughout. It will be understood that the figures are not necessarily to scale.

A. Overview

A(1). Parties

Various entities that may have a relationship to electromagnetic spectrum for use in wireless communications are described in this document. One entity is a government or regulatory agency. In the United States, the governmental agency may be the FCC. The governmental agency controls the rules and/or regulations for how wireless spectrum may be used. Exemplary rules governing certain spectrum are described in the above-mentioned FCC 08-260. Other exemplary agencies are Ofcom in the United Kingdom and the European Telecommunications Standards Institute (ETSI).

In some situations, there may be a spectrum holder. A spectrum holder is any entity having the authority to release spectrum use to another entity by granting the other entity access to the spectrum. The granting of access may be a temporary permission to use spectrum that is associated with the holder. Therefore, the access grant need not be a lease or a sub-lease, as defined by the FCC. The holder may be, but is not limited to, a government or regulatory agency (e.g., in the United States, the FCC), a Commission licensee (e.g., in the United States, an entity that has licensed spectrum from the FCC in the primary spectrum market), or a secondary market licensee.

Another party may be a spectrum user, or simply a user. A user is any entity or wireless communications system that has a need for spectrum in order to carry out wireless communications, such as for offering wireless communications services to others or Internet access to mobile client devices. Depending on the user and/or the type of application in which the user's radio devices are engaged, the user may use licensed or unlicensed spectrum. For example, with the transition of analog TV broadcasts to digital TV broadcasts, user radios may seek registration in accordance with FCC 08-260 to gain access to TV whitespace. These radios are referred to TV whitespace band radios (TVBDs). Therefore, one exemplary user may be a TVBD. Other types of whitespace are contemplated. As such, devices that operate in whitespace frequencies may be referred to more generically as white space devices (WSDs). Other users may be radio systems that request spectrum allocation from a spectrum management system or other source.

Still another party may be an entity or system that manages registration of the various users and/or allocates spectrum to various radio systems. Allocation of spectrum may include providing a channel map of available unlicensed bands (e.g., whitespace bands) and/or providing access to licensed spectrum. This party may carry out such management using a central registration system as described in greater detail below.

A(2). Wireless Communications Context

Aspects of the disclosed systems and methods are independent of the type or types of radio devices that may use spectrum. As such, the systems and methods may be applied in any operational context for wireless communications, and wireless communications are expressly intended to encompass unidirectional signal transmissions (e.g., broadcasting of a signal for receipt by a device without response) and to encompass bidirectional communications where devices engage in the exchange of signals. The methods and systems may be applied to dumb and/or cognitive radio devices. The methods and systems may be applied to fixed location and/or mobile radio devices. The methods and systems may be applied to licensed and/or unlicensed spectrum. Furthermore, the methods and systems are generic to modulation schemes, harmonic considerations, frequency bands or channels used by the radio devices, the type of data or information that is transmitted, how the radio devices use received information, and other similar communications considerations. Thus, the systems and methods have application in any suitable environment.

In the case of managing spectrum related to whitespace, radio systems with priority to the spectrum, including incumbent radio systems, have spectrum use rights that are superior to secondary spectrum users, such as WSDs. The secondary radio systems may use spectrum that is interleaved with spectrum used by priority (or primary) radio systems. A registration system to manage such spectrum use and allocation is described in U.S. patent application Ser. No. 12/423,094 filed Apr. 14, 2009, the disclosure of which is incorporated herein by reference in its entirety. A registration system of this nature may be combined with or coordinate its activity with the spectrum management system that is described in greater detail below.

Although aspects of the disclosed systems and methods are described in the exemplary context of TV whitespace, the disclosed concepts may be applied to other operational scenarios. One operational scenario includes a system in which requests or bids for spectrum are matched to available spectrum that is posted on a spectrum brokerage or exchange. A system that manages spectrum use and allocation in this operational context is described in U.S. patent Ser. No. 12/042,543 filed Mar. 5, 2008, the disclosure of which is incorporated herein by reference in its entirety. In this exemplary context, the user may be granted a spectrum certificate or other data object that specifies the spectrum that may be used by the user in terms of communications-related information, such as geography, frequency, spectral mask, time, and power limits.

B. Communication System

Figure 1:
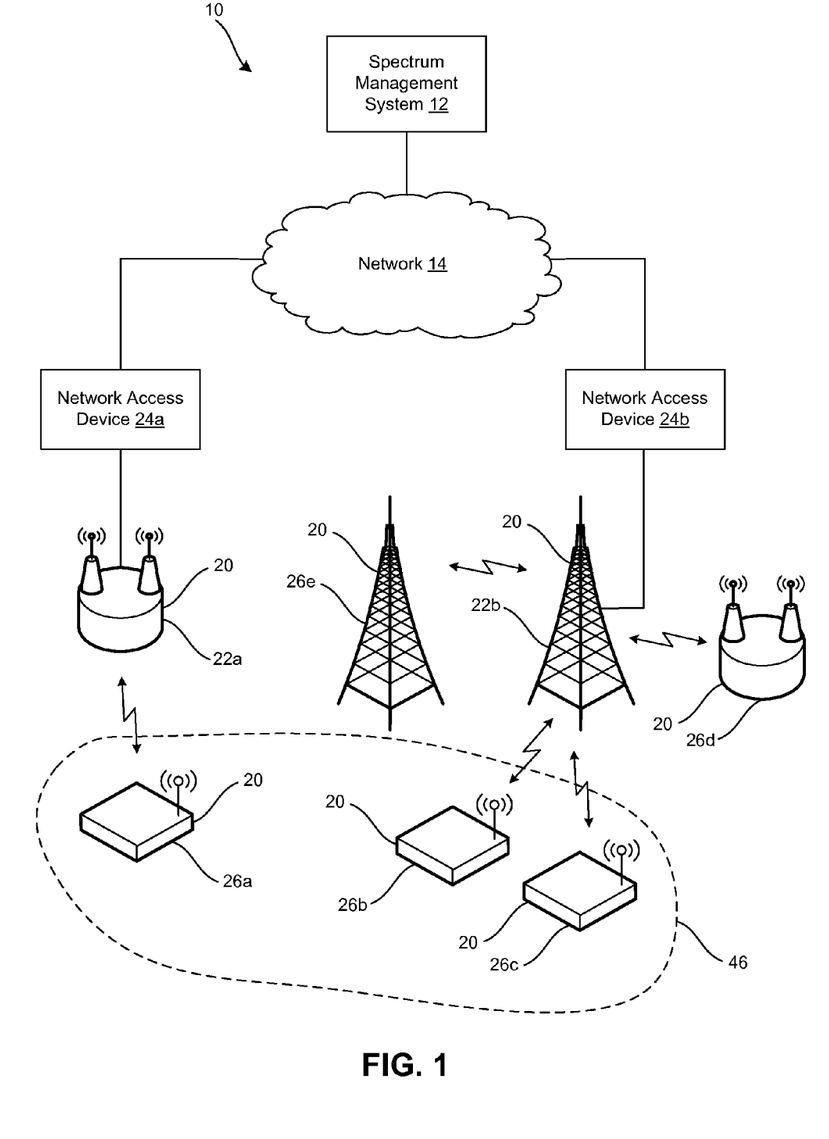
FIG. 1 is a schematic view of an exemplary communication system.

With initial reference to FIG. 1, an exemplary communication system 10 is illustrated. It will be understood that the illustrated and described communication system 10 is intended to include representative components that may take advantage of the techniques and devices that are described in greater detail below. Therefore, the topology of the depicted communication system 10 of FIG. 1 is for description purposes, and may vary from the topology that is shown.

B(1). System Topology

The system 10 may include a spectrum management system 12 that communicates with deployed radio devices through a network 14. The network 14 may be, for example, the Internet.

Figure 2:
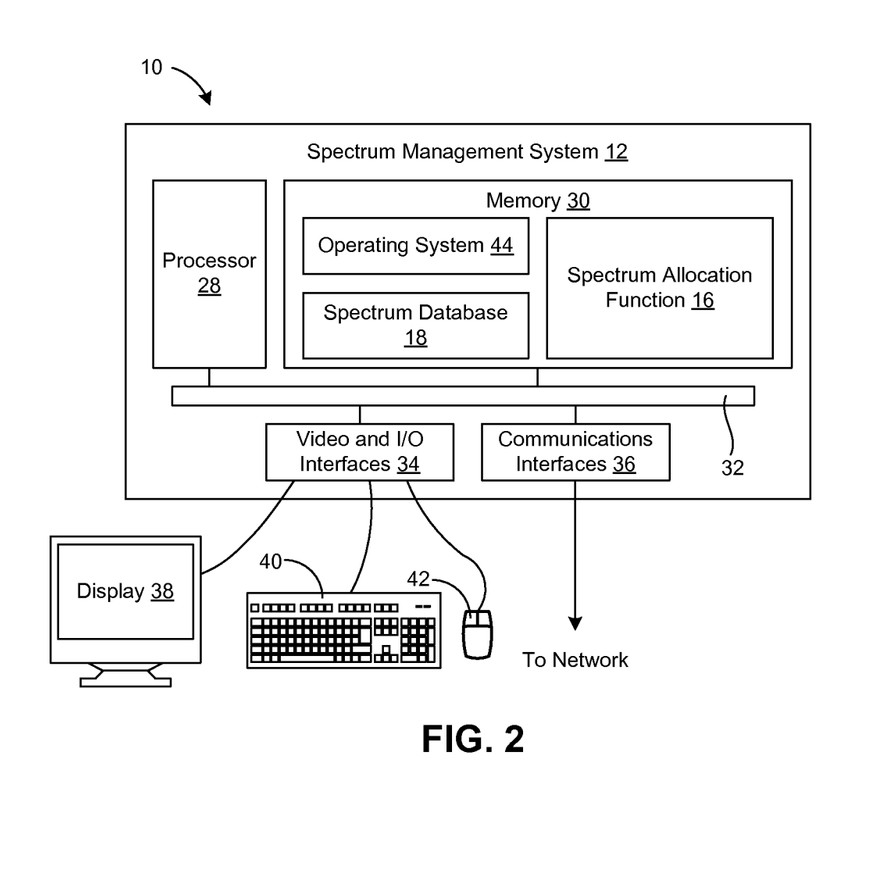
FIG. 2 is a schematic block diagram of an exemplary spectrum management system for overseeing spectrum use by radio devices in the exemplary communication system of FIG. 1.

With additional reference to FIG. 2, shown is a schematic block diagram of the spectrum management system 12. The spectrum management system 12 is a computer-based system that is capable of executing computer applications (e.g., software programs). The spectrum management system 12 may be configured to execute a spectrum allocation function 16, and to store a spectrum database 18 that contains data regarding spectrum availability and is used by the spectrum allocation function 16. In the illustrated embodiment, the spectrum allocation function 16 and the spectrum database 18 are commonly hosted in the spectrum management system 12. It will be appreciated that the spectrum allocation function 16 and/or the spectrum database 18 may be hosted in a more distributed manner.

In this embodiment, the spectrum management system 12 is tasked with making spectrum usage determinations and/or providing spectrum allocation (e.g., channel maps in the case of WSDs) to one or more radio systems 20. In one embodiment, the spectrum management system 12 may be a white space spectrum manager (WSSM) (also referred to as a white space service provider or WSSP). It will be appreciated that the spectrum management system 12 may allocate and manage other types of spectrum, such as licensed spectrum or non-whitespace unlicensed spectrum. Each radio system 20 may be an individual radio device or a network of radio devices. Also, each radio system 20 may include at least one transceiver for engaging in wireless communications and a controller for managing radio system operation. Each radio system 20 controller may carry out the logical functions described in greater detail in the following sections. The controller may be implemented using, for example, computing technology such as a processor that executes logical instructions (e.g., a software program that embodies the logical functions in the form of code) and a memory that stores the logical instructions and related data.

Various categories of radio systems 20 may exist. For instance, some of the radio systems 20 may be hubs 22. An exemplary type of hub 22 is a mode II WSD, such as the illustrated hub 22a. Another exemplary type of hub 22 is a fixed radio device (e.g., a radio tower), such as the hub 22b. Each hub 22 has operative communication connectivity to the spectrum management system 12, such as through the network 14. To support this connectivity, network access device 24 may be present between the hub 22 and the network. For instance, the hub 22a may connect to the network 14 using a cable modem. Although not illustrated, a firewall may be logically placed between the spectrum management system 12 and the network 14. Firewalls also may be logically present between each network access device 24 and the network 14.

Each hub 22 may serve as a master for additional radio devices, such as spoke radio devices 26. Each spoke 26 establishes operative communication connectivity to the network 14 through an associated hub 33. An exemplary type of spoke radio device 26 is a mode I WSD, such as the spoke 26a that is associated with the hub 22a and the spokes 26b and 26b that are associated with the hub 22b. Another exemplary type of spoke radio device 26 is a mode II WSD, such as the spoke 26d that is associated with the hub 22b. Another exemplary type of spoke radio device 26 is a fixed radio device, such as the spoke 26e that is associated with hub 22b.

A mode I radio device may be WSD and may be a personal or portable radio that relies on a fixed radio or on a mode II radio for network (e.g., Internet) access. Mode I radios typically do not have a provisioned geographic location (GEO location). The mode I radio devices may operate at relatively low power (e.g., about 100 milliwatts for a WSD). A mode I radio device need not be a WSD.

A mode II radio device may be a WSD and may be a personal or portable radio that has a provisioned GEO location and typically has Internet access capability. The mode II radio devices may operate at relatively low power (e.g., about 100 milliwatts for a WSD). In some situations, mode II radio devices may be embodied as access points, such as for a providing WiFi access to client devices. A mode II radio device need not be a WSD.

A fixed radio device is typically a high power, outdoor device that operates at relatively high power (e.g., about 4 watts for a WSD). In most cases, fixed radio devices are provisioned with GEO location and have Internet access capability. A fixed radio device need not be a WSD.

In an embodiment where the radio devices 20 are WSDs, fixed radio devices and mode II devices may serve as hubs 22. In addition, for WSD hubs 22 that are mode II devices, mode I devices may be spokes 26 (e.g., mode II WSD devices that serve as hubs 22 may not serve as hubs 22 to other mode II WSD devices or fixed devices). For WSD hubs 22 that are fixed devices, each of fixed devices, mode II devices and mode I devices may be spokes 26. A fixed device or a mode II device that are spokes of a hub may further serve as hubs for additional spoke devices.

B(2). Spectrum Management System

As indicated, the spectrum management system 12 may be implemented with computer technology. In one embodiment, the spectrum allocation function 16 is embodied as one or more computer programs (e.g., one or more software applications including compilations of executable code). The computer program(s) and/or database 18 may be stored on a computer readable medium, such as a memory in the form of a magnetic, optical or electronic storage device (e.g., hard disk, optical disk, flash memory, etc.).

To execute the function 16, the system 12 may include one or more processors 28 used to execute instructions that carry out a specified logic routine(s). In addition, the system 12 may have a memory 30 for storing data, logic routine instructions, computer programs, files, operating system instructions, and the like. As illustrated, the function 16 and the database 18 may be stored by the memory 30. The memory 30 may comprise several devices, including volatile and non-volatile memory components. Accordingly, the memory 30 may include, for example, random access memory (RAM) for acting as system memory, read-only memory (ROM), hard disks, floppy disks, optical disks (e.g., CDs and DVDs), tapes, flash devices and/or other memory components, plus associated drives, players and/or readers for the memory devices. The processor 28 and the components of the memory 30 may be coupled using a local interface 32. The local interface 32 may be, for example, a data bus with accompanying control bus, a network, or other subsystem.

The system 12 may have various video and input/output (I/O) interfaces 34 as well as one or more communications interfaces 36. The interfaces 34 may be used to operatively couple the system 12 to various peripherals, such as a display 38, a keyboard 40, a mouse 42, and other input and/or output devices. The communications interface 36 may include for example, a modem and/or a network interface card. The communications interface 36 may enable the system 12 to send and receive data signals, voice signals, video signals, and the like to and from other devices, including the radios 20, via the network 14.

The memory 30 may store an operating system 44 that is executed by the processor 28 to control the allocation and usage of resources in the system 12, as well as provide basic user interface features. Specifically, the operating system 42 controls the allocation and usage of the memory 30, the processing time of the processor 28 dedicated to various applications being executed by the processor 28, and the peripheral devices, as well as performing other functionality. In this manner, the operating system 44 serves as the foundation on which applications, such as the function 16, depend as is generally known by those with ordinary skill in the art. The operating system 44 also may control much of the user interface environment presented to a user, such as features of the overall graphical user interface (GUI) for the system 12.

In one embodiment, the system 12 may be configured as a server that executes the function 16 to host the below-described spectrum management functions. The spectrum management functions include providing spectrum use determinations to qualified users (e.g., as embodied as the radio system(s) 20) so that the users may make use of spectrum for wireless communications.

In the embodiment where the unlicensed spectrum is TV whitespace, the spectrum database 18 may be implemented using a whitespace database and the system 12 may serve as a registration system that is constructed in accordance with the above-mentioned FCC Report and Order and/or implemented in accordance with the above-mentioned U.S. patent application Ser. No. 12/423,094. The information included in this database may describe the location, contour, access or use rules (e.g., transmit power limits), and any other pertinent data related to the unlicensed spectrum.

C. Spectrum Management

Conventional spectrum management, allocation and acquisition techniques focus on the situation where radio devices have communication access to a spectrum management system from which a spectrum allocation (e.g., a quantifiable amount of licensed spectrum or a channel map of available whitespace channels) may be obtained. If the radio device is a master to slave radio devices, then the slave (or client) devices are effectively tethered to the same spectrum allocation as the master radio device. An example of this situation is where the radio device that acquires a spectrum allocation is a WiFi access point (or base station) that services client devices. The client devices may scan to locate the channel used by the access point, and then establish communication with the access point using that channel. Cellular networks use similar a scanning mechanism for mobile handsets to obtain a channel from a cellular base station (also referred to as a cell site).

But there are other scenarios that are not addressed by these conventional techniques. For instance, some radios, such as the above-described spoke 26, may be considered client devices of other radios, such as the above-described hubs 22, in so far as the client devices obtain network 14 access through the other radios. But in some cases, the spoke radio devices 26 are not slaves to the corresponding hubs 22 since the spokes 26 are responsible for acquire their own spectrum allocations from a the spectrum management system 12.

For instance, if two or more spokes 26 are used to form a network 46, then the individual nodes of the network 46 (e.g., the spokes 26) may be responsible for individually or collectively acquiring a spectrum allocation or responsible for making an independent spectrum use determination so as to operate wireless communications over the network 46. The network 46 may be, for example, an ad hoc network and may have a topology such as point-to-point, point-to-multipoint or mesh.

The disclosure that follows addresses at least two challenges in affording spectrum access to spoke radio devices 26, or other devices that encounter similar challenges. The first challenge is providing a mechanism by which a remote radio (e.g., a spoke 26) may access and communicate with the spectrum management system 12. As will be described, the remote radios may first interact with other radio devices (e.g., hubs 22) that have an established connection with the spectrum management system 12. The second challenge is providing a mechanism by which various radios may identify a common spectrum allocation over which communication may be made. This communication may include the establishment of an independent network, such as the network 46. As will be described, these radios may be managed to operate using available spectrum (e.g., free whitespace channels) and with minimal or no interfere to licensed or occupied channel transmissions.

While some examples are described in the context of using TV white space for spectrum allocation, it will be appreciated that the techniques are applicable to other spectrum. Therefore, any descriptions in the context of TV white space may be equally applied or modified to the allocation of licensed spectrum and/or other forms of unlicensed spectrum.

C(1). Spectrum Allocation Overview

As indicated, the spectrum management system 12 may serve as a central spectrum manager for remote radios 20 that are intended to operate in a geographical region. Spectrum may be allocated to the radios using available spectrum such as, but not limited to, free whitespace channels. If spectrum used by a radio 20 becomes occupied, the spectrum management system 12 may have the radio renegotiate its spectrum allocation. The spectrum management system 12 may avail spectrum based on various considerations, such as application of the radio 20, expected quality of service (QoS), and so forth.

In one embodiment, each of the fixed radio devices and the mode II radio devices that function as hubs 22 have a unique manufacturer identifier (ID), a unique serial number and/or a unique FCC certification ID, and has known geographical location information. Using this information, the hubs 22 may register with the spectrum management system 12 and receive a channel map or other spectrum allocation. Each hub 22 may disable its transceiver if it does not have a currently valid channel map or other spectrum allocation. Also, each of the mode I radio devices have a unique manufacturer ID and a unique serial number. The mode I radio devices are configured to register with the spectrum management system 12, but may not need or request a channel map in some operational circumstances. Rather, the mode I radio devices may operate using the same channel as their associated HUB 22 in a client/master arrangement. In other embodiments, a mode I radio device may make an independent spectrum use determination.

The spectrum management system 12 may be configured to revoke a spectrum allocation (e.g., revoke a channel map or a portion of a channel map) if a higher priority device (sometimes referred to as a protected device) becomes registered in the location of the device that received the spectrum allocation. Exemplary higher priority devices are cable head ends, microwave systems, fixed broadcast auxiliary service (BAS) links, wireless microphone systems, licensed TV stations, etc. In the event that a radio device's spectrum allocation is revoked, the radio device may be configured to renegotiate its registration and, if appropriate, obtain a new channel map of other spectrum allocation.

Each hub 22 may obtain a channel map (or other spectrum allocation) for its wireless communication operations and the channel map is based on the geographic location of the hub 22. The channel map may be provided by the spectrum management system 12 and, if the hub 22 provides radio capability information and/or communications application information to the spectrum management system 12, the channel map may be adapted to the information received from the hub 22. In some cases, the hub 22 may auto negotiate its channel map based on one or more of radio capabilities, application, and information attained by scanning spectrum use in the geographic location of the hub 22. Channel maps may be valid for a predetermined amount of time and only for the location at the time of registration. Therefore, a new channel map may be acquired if the validity of the channel map expires.

Once the Hub 22 obtains a channel map and decides which channel from the channel map to use, the hub 22 may broadcast a beacon. The beacon may be broadcast periodically according to a predetermined time interval and may contain information regarding the identity and capabilities of the spectrum management system 12. Any potential spokes 26 (e.g., radio devices not currently associated with a hub 22) may listen (e.g., by background scanning) for the beacon. The beacon scanning may be carried out passively on each channel for which the potential spoke 26 has the ability to operate and at each possible data rate. In the case where there is more than one spectrum management system 12, the potential spoke 26 may have a prioritized list of spectrum management systems 12 that is ordered based on spectrum management system 12 preference. The beacon scanning may attempt to find a hub 22 that is registered with the highest priority spectrum management system 12 possible. Similar prioritization and preference scanning may be made on other criteria, such as operating channel and data rate. The prioritization for operating channel and data rate may be made on various factors, such as predetermined or historical channel performance data, prior arrangements with other radio devices, and so forth.

Once the potential spoke 26 identifies a valid beacon from a hub 22, the potential spoke 26 may transmit a join request (which may be in the form of a command) to join the network effectively formed by the hub 22. Then, the hub 22 may be respond with a grant so as to inform the spoke 26 that the spoke 26 has been granted communication access. The spoke 26 then may lodge on the corresponding channel. If a spoke looses its wireless connectivity to the network for a predetermined amount of time, it may repeat the beacon scanning and joining process. On the other hand, any unlicensed radio devices that have wired or other established connectivity to the spectrum management system 12 need not perform the foregoing background scanning.

A group of spokes 26, such as a group of mode I radio devices, may collaborate to form an ad hoc network, such as the network 46. In one embodiment, background scanning capability of the spoke 26 is used to periodically check to determine if spectrum usage to operate the network does not interfere with spectrum usage by others in the geographic area of the network 46. The results of the scanning may lead the spokes 26 involved in the network to coordinate their channel tuning. In another embodiment, the spectrum management system 12 may be configured to facilitate and manage spectrum usage for the network 46. In one embodiment, the spectrum management system 12 may provide a channel map for the network 46 and revoke the channel map if the network 46 may cause interference to one or more other radio devices.

C(2). Detailed Spectrum Allocation—Hub-Related Functions

Figure 3:
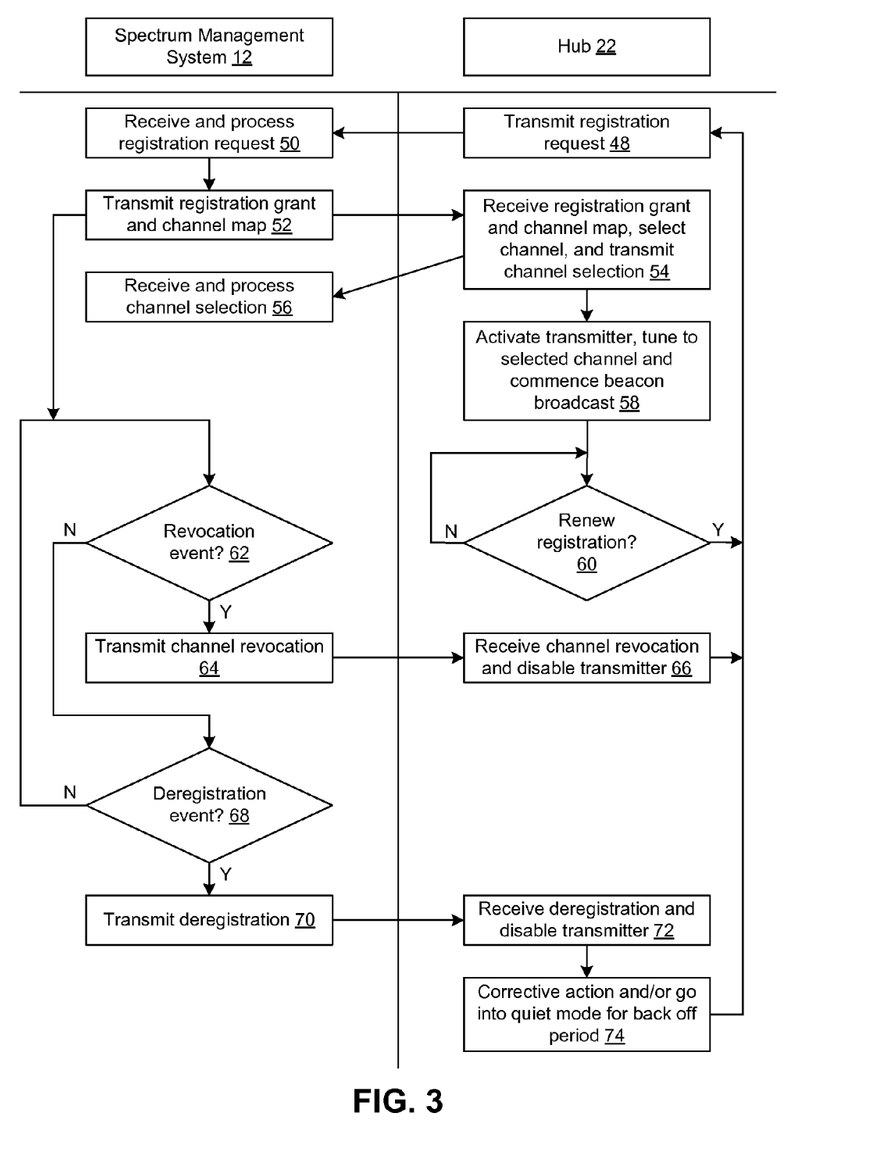
FIGS. 3-5 are exemplary flowcharts representing functional operations carried out by components of the exemplary communication system of FIG. 1.

With additional reference to FIG. 3, illustrated are logical and functional actions taken by one of the hubs 22 and the spectrum management system 12 to register the hub 22 with the spectrum management system 12 and use the hub 22 to conduct wireless communications. The actions of the spectrum management system 12 may be carried out by executing the spectrum allocation function 16 and the actions of the hub 22 may be carried out by executing a corresponding program of the hub 22. Thus, the flow chart of FIG. 3 may be thought of as depicting steps of corresponding methods carried out respectively by the spectrum management system 12 and the hub 22. Although FIG. 3 shows a specific order of executing functional blocks, the order of executing the blocks may be changed relative to the order shown. Also, two or more blocks shown in succession may be executed concurrently or with partial concurrence. Certain blocks also may be omitted.

In one embodiment, the described interactions between the hub 22 and spectrum management system 12 may be carried out by transmitting appropriate messages over the network 14.

The functional flow may begin with the transmitter of the hub 22 in an off state and the hub 22 not having a currently valid registration from the spectrum management system 12. To commence wireless communications the hub 22, in block 48, may transmit a registration request to the spectrum management system 12. The registration request may include information to identify the hub 22, such as an FCC ID, and information about the location of the hub 22, such as GEO location. In one embodiment, the request also may include information about the radio characteristics of the hub 22 and/or the types of communications applications in which the hub 22 is intended to be used.

In block 50, the spectrum management system 12 may receive and process the registration request. Processing the request may include analyzing the information in the request and generating a channel map or other spectrum allocation for the hub 22 that is appropriate for the location of the hub 22. In one embodiment, the channel map or other spectrum allocation may be further based on the device capabilities of the hub 22. Next, in block 52, the spectrum management system 12 may transmit a registration grant and spectrum allocation (e.g., a channel map) to the hub 22.

In block 54, the hub 22 may receive the registration grant and spectrum allocation. If more than one channel is specified as being available to the hub 22 in the spectrum allocation, the hub 22 may select a channel for use. For instance, a channel map may indicate that there are plural whitespace channels that are available to the hub 22. In this case, the hub 22 may select an appropriate channel for use. Channel choice may be based on a variety of factors, such as radio capabilities, known or predicted spectrum use by other radio devices, historical channel performance, and so forth.

The channel selection may be communicated to the spectrum management system 12. In block 56, the spectrum management system 12 may receive and process the channel selection. The spectrum management system 12 may use the channel selection information for future tasks, such as determining if a revocation event affecting the hub 22 has occurred or constructing channels maps for other radio device 20 so as to reduce the possibility of interference among the radio devices 20.

Following block 54, the hub 22 may commence radio communications using the selected channel (e.g., in the case where the spectrum allocation is a channel map) or using specifically indicated spectrum in the spectrum allocation. For instance, in block 58, the hub 22 may activate its transceiver, tune to the appropriate channel, and engage in wireless communication activity.

In addition, the hub 22 may broadcast a beacon. Broadcast of the beacon may be continuously repeated at a predetermined beacon broadcast interval. As will be discussed below, potential spokes 26 may listen for the beacon that is broadcast by the hub 22.

In block 60, the hub 22 may monitor for a condition that indicates that it is appropriate for the hub 22 to renew its registration. For instance, the hub 22 may be required under FCC guidelines to reregister every twenty-four hours or if the GEO location of the hub 22 changes. In other embodiments, the registration grant may be valid for a limited period of time or have some other expiration determined by the spectrum management system 12. If a positive determination is made in block 60, the logical flow may return to block 48 to repeat the registration process. If a negative determination is made in block 60, the communications activity of the hub 22 may continue.

After transmission of the registration grant and spectrum allocation (e.g., channel map) in block 52, the spectrum management system 12 may monitor for conditions that affect the registration grant or use of spectrum in the spectrum allocation by the hub 22. For example, in block 62, the spectrum management system 12 may monitor for a revocation event. A revocation event may arise, for example, when a device having higher use priority for spectrum contained in the spectrum allocation becomes active in the GEO location of the hub 22. In this case, a positive determination may be made in block 62 and a channel revocation may be transmitted to the hub 22 in block 64. The channel revocation may be received by the hub 22 in block 66. In response to receipt of the channel revocation, the hub 22 may disable its transmitter and seek a new spectrum allocation by returning to block 48 to undertake the registration process.

As another example, in block 68, the spectrum management system 12 may monitor for a deregistration event. A deregistration event may arise, for example, when the hub 12 becomes temporarily "blacklisted," such as by engaging in wireless communications that are not in accordance with the spectrum allocation. Such spectrum use may include, for example, using spectrum from the spectrum allocation after the expiration of the registration grant, using unallocated spectrum, broadcasting over an allowed power limit, failing to abide by a channel revocation, etc. If a deregistration event occurs, a positive determination may be made in block 68 and a deregistration may be transmitted to the hub 22 in block 70. The deregistration may be received by the hub 22 in block 72. In response to receipt of the deregistration, the hub 22 may disable its transmitter (e.g., enter a "quiet mode"). Then, in block 74, the hub 22 may take corrective action, if appropriate, and the hub 22 may seek a new spectrum allocation by returning to block 48 to undertake the registration process. In one embodiment, following receipt of a deregistration, the hub 22 may not seek registration until a predetermined back off period elapses. If conditions exist so that an attempt at registration following a deregistration event is denied by the spectrum management system 12, the back off period for a next registration attempt may be extended. For example, following a registration denial, the hub 22 may enter the quiet mode for an exponentially increasing back off period. The back off period may have a maximum duration, such as twenty-four hours.

Figure 4:
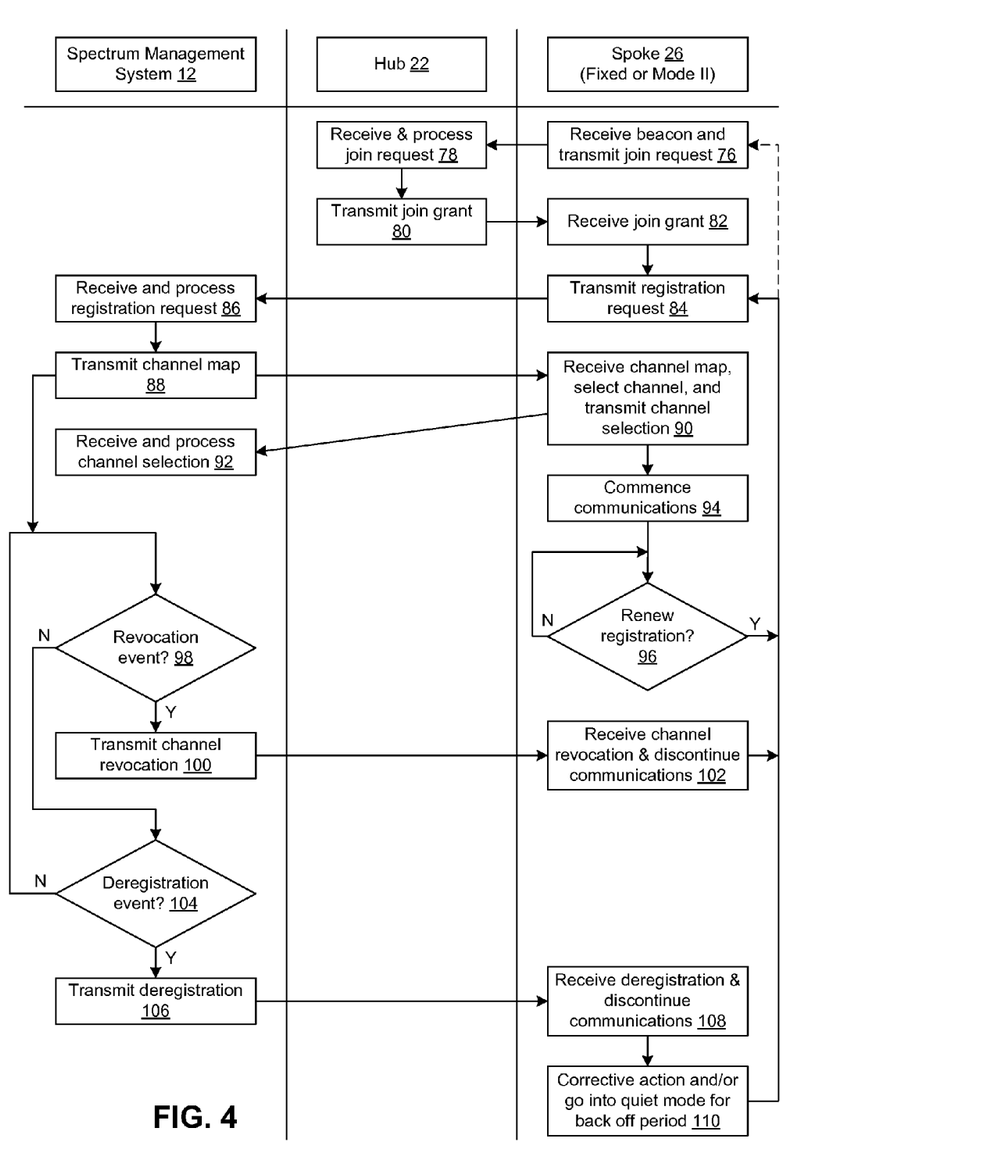

C(3). Detailed Spectrum Allocation—Fixed and Mode II Spoke-Related Functions With additional reference to FIG. 4, illustrated are logical and functional actions taken by one of the spokes 26, an associated one of the hubs 22, and the spectrum management system 12 to register the spoke 26 with the spectrum management system 12 and to enable the spoke 26 to conduct wireless communications. In the embodiment of FIG. 4, the spoke 26 is one of a fixed radio device or a mode II radio device.

The actions of the spectrum management system 12 may be carried out by executing the spectrum allocation function 16, and the actions of the hub 22 and the spoke 26 may be carried out by executing corresponding programs of the hub 22 and the spoke 26. Thus, the flow chart of FIG. 4 may be thought of as depicting steps of corresponding methods carried out respectively by the spectrum management system 12, the hub 22, and the spoke 26. Although FIG. 4 shows a specific order of executing functional blocks, the order of executing the blocks may be changed relative to the order shown. Also, two or more blocks shown in succession may be executed concurrently or with partial concurrence. Certain blocks also may be omitted.

In one embodiment, the described interactions between the hub 22 and spectrum management system 12 may be carried out by transmitting appropriate messages over the network 14. Also, interactions between the spoke 26 and the hub 22 may be carried out wirelessly over a communication link that is established using the spectrum that was allocated to the hub 22 in block 52 and, if applicable, selected by the hub 22 in block 54. Interactions between the spoke 26 and the spectrum management system may be made through the associated hub 22 over the established communication link between the hub 22 and the spoke 26, and then through the network 14. As such, the hub 22 functions as a communication pathway for communications between the spoke 26 and the spectrum management system 12.

The functional flow may begin in block 76 where the spoke 26, which has been listening (e.g., scanning) for beacons that are broadcast by one or more hubs 22, receives a beacon. In the event that more than one beacon is received, the spoke 26 may select one of the corresponding hubs 22 based on priority criteria or other preference data, as indicated above. Also, in block 76, the spoke 26 may transmit a join request to the hub 22.

In block 78, the hub 22 may receive and process the join request. For example, in block 80, the hub 22 may transmit a join grant to the spoke 26, which is received by the spoke 26 in block 82. The join grant may be a permission for the spoke to use the hub 22 as a connectivity pathway to the spectrum management system 12. In one embodiment, communications between the spoke 22 and the spectrum management system 12 take place over the channel selected by the hub 22 in block 54.

Next, the spoke 22 may seek its own registration with the spectrum management system 12. For instance, to commence its own wireless communications the spoke 26, in block 84, may transmit a registration request to the spectrum management system 12. The registration request may include information to identify the spoke 26, such as an FCC ID, and information about the location of the spoke 26, such as GEO location. In one embodiment, the request also may include information about the radio characteristics of the spoke 26 and/or the types of communications applications in which the spoke 26 is intended to be used.

In block 86, the spectrum management system 12 may receive and process the registration request. Processing the request may include analyzing the information in the request and generating a channel map or other spectrum allocation for the spoke 26 that is appropriate for the location of the spoke 26. In one embodiment, the channel map or other spectrum allocation may be further based on the device capabilities of the spoke 26. Next, in block 88, the spectrum management system 12 may transmit a spectrum allocation (e.g., a channel map) to the spoke 26.

In block 90, the spoke 26 may receive the spectrum allocation. If more than one channel is specified as being available to the spoke 26 in the spectrum allocation, the spoke 26 may select a channel for use. For instance, a channel map may indicate that there are plural whitespace channels that are available to the spoke 26. In this case, the spoke 26 may select an appropriate channel for use. Channel choice may be based on a variety of factors, such as radio capabilities, known or predicted spectrum use by other radio devices, historical channel performance, and so forth. In one embodiment, if the channel map that is obtained from the spectrum management system 12 has a channel on which the spoke 26 established a link to the spectrum management system 12 through the hub 22, then the spoke 26 may park on that channel by selecting that channel. In cases where the channel map does not have the channel through which the spoke 26 established connectivity to spectrum management system via the hub 22, then the channel may be deemed by the spoke 22 as blacklisted for a predetermined duration. In this case, the spoke 26 also may perform background scanning on channels to which the spoke 26 is capable of tuning (excluding the blacklisted channel) to attempt to establish connectivity to the spectrum management system 12 through a different hub 22 or on a different channel. If a beacon from a different hub 22 or on a different channel is detected, then the spoke 26 may return to block 76. Otherwise, the spoke 26 may select an available channel from the channel map that was already received. Alternatively (instead of selecting a channel), the spoke 26 may wait at block 76 for the receipt of a beacon or the blacklisting to be lifted.

The channel selection may be communicated to the spectrum management system 12. In block 92, the spectrum management system 12 may receive and process the channel selection. The spectrum management system 12 may use the channel selection information for future tasks, such as determining if a revocation event affecting the spoke 26 has occurred or constructing channels maps for other radio devices 22 so as to reduce the possibility of interference among the radio devices 20.

Following block 90, the spoke 26 may commence radio communications using the selected channel (e.g., in the case where the spectrum allocation is a channel map) or using the specifically indicated spectrum in the spectrum allocation. For instance, in block 94, the spoke 26 may tune to the appropriate channel and commence wireless communication operations to support any applications for which the spoke 26 was deployed. In addition, the spoke 26 may broadcast a beacon to function as an additional hub in accordance with the functions described in connection with FIG. 3.

In block 96, the spoke 26 may monitor for a condition that indicates that it is appropriate for the spoke 26 to renew its registration. For instance, the spoke 26 may be required under FCC guidelines to reregister every twenty-four hours or if the GEO location of the spoke 26 changes. In other embodiments, the registration grant may be valid for a limited period of time or have some other expiration determined by the spectrum management system 12. If a positive determination is made in block 96, the logical flow may return to block 84 to undertake the registration process. If a negative determination is made in block 96, the communications activity of the spoke 26 may continue.

After transmission of the spectrum allocation (e.g., channel map) in block 88, the spectrum management system 12 may monitor for conditions that affect the registration grant or use of spectrum in the spectrum allocation by the spoke 26. For example, in block 98, the spectrum management system 12 may monitor for a revocation event. A revocation event may arise, for example, when a device having higher use priority for spectrum contained in the spectrum allocation becomes active in the GEO location of the spoke 26. In this case, a positive determination may be made in block 98 and a channel revocation may be transmitted to the spoke 26 in block 100. The channel revocation may be received by the spoke 26 in block 102. In response to receipt of the channel revocation, the spoke 26 may discontinue communication under the spectrum allocation received in block 90. In effect, the spoke 26 may deem the revoked channel(s) to be blacklisted for a revocation interval. In this case, the spoke may seek a new spectrum allocation by returning to block 76 to undertake the registration process starting with performing background scanning on channels to which the spoke 26 is capable of tuning (excluding the blacklisted channel) to attempt to establish connectivity to the spectrum management system 12.

As another example, in block 104, the spectrum management system 12 may monitor for a deregistration event. A deregistration event may arise, for example, when the spoke 26 becomes temporarily "blacklisted," such as by engaging in wireless communications that are not in accordance with the spectrum allocation. Such spectrum use may include, for example, using spectrum from the spectrum allocation after its expiration, using unallocated spectrum, broadcasting over an allowed power limit, failing to abide by a channel revocation, etc. If a deregistration event occurs, a positive determination may be made in block 104 and a deregistration may be transmitted to the spoke 26 in block 106. The deregistration may be received by the spoke 26 in block 108. In response to receipt of the deregistration, the spoke 26 may discontinue communication under the channel map received in block 90. Then, in block 110, the spoke 26 may take corrective action, if appropriate, and the spoke 26 may seek a new spectrum allocation by returning to block 84 to undertake the registration process. In one embodiment, following receipt of a deregistration, the spoke 26 may not seek registration until a predetermined back off period elapses. For example, the spoke 26 may enter the quiet mode during the back off period, which may be, for example, twenty-four hours.

If the spoke 26 looses communication with the hub 22 so that the spoke 26 cannot communicate with the spectrum management system 12 through the hub 22 or if the grant that was received in block 82 expires, the operation of the spoke 26 may return to block 76. In one embodiment, loss of communication with the hub 22 may be monitored by periodically scanning for the beacon from the hub 22. Also, instead of returning to block 84 after any one of blocks 102 or 110, or after a positive determination in block 96, the operation of the spoke 26 may return to block 76.

C(4). Detailed Spectrum Allocation—Mode I Spoke-Related Functions

Figure 5:
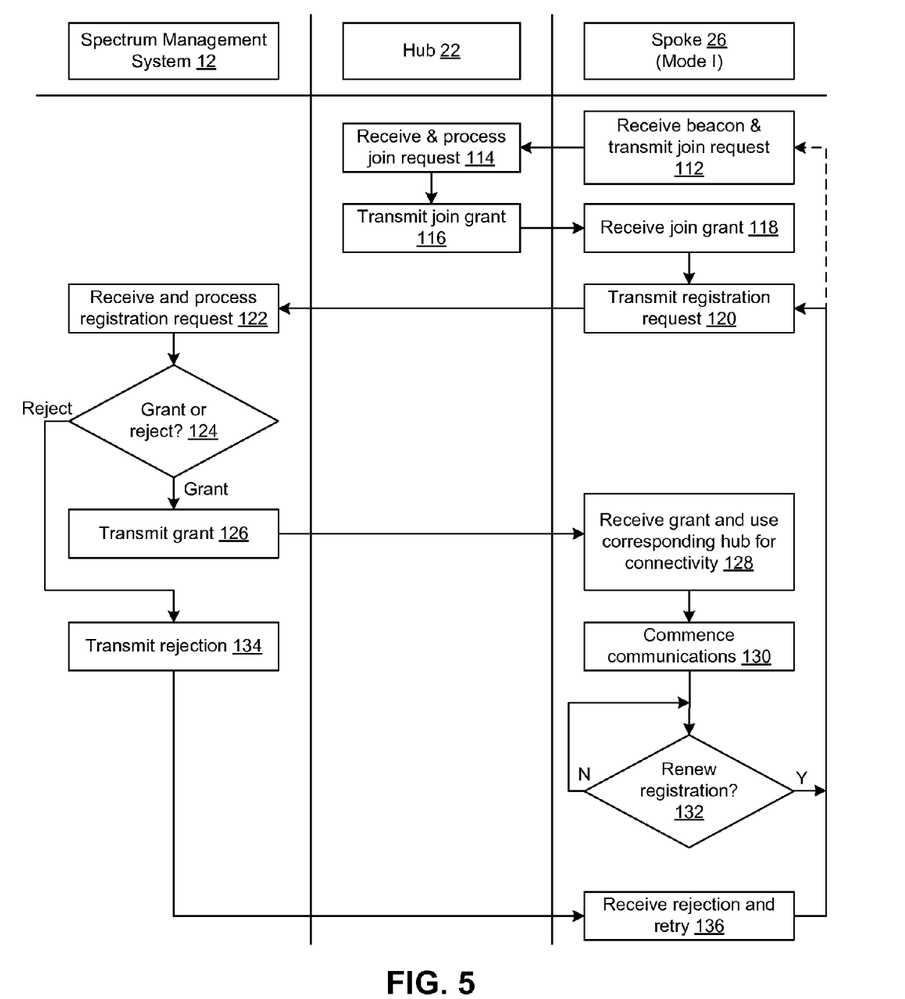

With additional reference to FIG. 5, illustrated are logical and functional actions taken by one of the spokes 26, an associated one of the hubs 22, and the spectrum management system 12 to enable the spoke 26 to communicate with the spectrum management system 12 and to enable the spoke 26 to conduct wireless communications. In the embodiment of FIG. 5, the spoke 26 is a mode I radio device.

The actions of the spectrum management system 12 may be carried out by executing the spectrum allocation function 16, and the actions of the hub 22 and the spoke 26 may be carried out by executing corresponding programs of the hub 22 and the spoke 26. Thus, the flow chart of FIG. 5 may be thought of as depicting steps of corresponding methods carried out respectively by the spectrum management system 12, the hub 22, and the spoke 26. Although FIG. 5 shows a specific order of executing functional blocks, the order of executing the blocks may be changed relative to the order shown. Also, two or more blocks shown in succession may be executed concurrently or with partial concurrence. Certain blocks also may be omitted.

In one embodiment, the described interactions between the hub 22 and spectrum management system 12 may be carried out by transmitting appropriate messages or data communication over the network 14. Also, interactions between the spoke 26 and the hub 22 may be carried out wirelessly over a communication link that is established using the spectrum that was allocated to the hub 22 in block 52 and, if applicable, selected by the hub 22 in block 54. Interactions between the spoke 26 and the spectrum management system may be made through the associated hub 22 over the established communication link between the hub 22 and the spoke 26, and then through the network 14. As such, the hub 22 functions as a communication pathway for communications between the spoke 26 and the spectrum management system 12.

The functional flow may begin in block 112 where the spoke 26, which has been listening (e.g., scanning) for beacons that are broadcast by one or more hubs 22, receives a beacon. In the event that more than one beacon is received, the spoke 26 may select one of the corresponding hubs 22 based on priority criteria or other preference data, as indicated above. Also, in block 112, the spoke 26 may transmit a join request to the hub 22.

In block 114, the hub 22 may receive and process the join request. For example, in block 116, the hub 22 may transmit a join grant to the spoke 26, which is received by the spoke 26 in block 118. The join grant may be a permission for the spoke 26 to use the hub 22 as a connectivity pathway to the spectrum management system 12. In one embodiment, communications between the spoke 22 and the spectrum management system 12 take place over the channel selected by the hub 22 in block 54.

Next, the spoke 22 may seek its own registration with the spectrum management system 12. For instance, to commence its own wireless communications the spoke 26, in block 120, may transmit a registration request to the spectrum management system 12. The registration request may include information to identify the spoke 26, such as an FCC ID, and information about the location of the spoke 26, such as GEO location. In one embodiment, the request also may include information about the radio characteristics of the spoke 26 and/or the types of communications applications in which the spoke 26 is intended to be used.

In block 122, the spectrum management system 12 may receive and process the registration request. Processing the request may include analyzing the information in the request and, in block 124, determining whether to grant or reject the request. If a grant determination is made, the logical flow may proceed to block 126 where a grant is transmitted to the spoke 26.

The grant may be received by the spoke 26 in block 128. The grant indicates to the spoke 26 that the spoke 26 may use the corresponding hub 22 for connectivity to the communication system 10. In block 130, the spoke 26 may commence wireless communications with other wireless radio devices.

In one embodiment, the spectrum management system 12 does not transmit a channel map or other spectrum allocation to the spoke 12. Also, in this embodiment, the spectrum management system 12 does not exert control over the spoke 26 by monitoring for conditions that would affect the use of spectrum by the spoke 26, such as a revocation event or a deregistration event. As such, no revocation or deregistration commands will be transmitted to the spoke 26.

Rather than relying on a spectrum allocation from the spectrum management system 12 for the communications of block 130, the spoke 26 will make its own determination of what spectrum to use for wireless applications of the spoke 26. In one embodiment, the spoke 26 passively listens to a predetermined set of channels for other wireless communications activity. The predetermined set of channels may be channels provisioned on the spoke 26, and that correspond to the communications system 10. For instance, if there are plural communications systems 10 that are each managed by a different spectrum management system 12, each communications system 10 may have an associated set of channels for use by mode I spokes 26. Also, the predetermined set of channels may have correspondence to the hub 22 through which the spoke 26 communicates with the spectrum management system 12, or may have correspondence to the location of the spoke 26. The channels available to the spoke 26 under these criteria may be prioritized so as to establish a preference order of the channels. Depending on the application of the spoke 26, the spoke 26 may select the highest priority channel that has less than a predetermined amount of wireless communications activity from other radio devices. Alternatively, when attempting to join the network 46 formed by other radio devices 20, the channel selection by the spoke 26 may be coordinated with the channel selection of other spokes 26 to join or form the network 46.

In block 132, the spoke 26 may monitor for a condition that indicates that it is appropriate for the spoke 26 to renew its registration. For instance, the spoke 26 may be required under FCC guidelines to reregister every twenty-four hours or if the GEO location of the spoke 26 changes. In other embodiments, the registration grant may be valid for a limited period of time or have some other expiration determined by the spectrum management system 12. If a positive determination is made in block 132, the logical flow may return to block 120 to undertake the registration process. Alternatively, the logical flow may return to block 112 to undertake the joining process and the registration process. If a negative determination is made in block 130, the communications activity of the spoke 26 may continue.

With reference again to block 124, the spectrum management system 12 may make a rejection determination if it is desirable to keep the spoke 26 from engaging in wireless communications activity. Such a situation may arise, for example, the temporary presence of higher priority radio devices (e.g., radio devices for emergency responders). If a rejection determination is made in block 124, the spectrum management system 12 may transmit a rejection in block 134. The rejection may be received by the spoke 26 in block 136. In response to receipt of the rejection, the spoke 26 may return to block 120 to attempt to undertake the registration process. Alternatively, the logical flow may return to block 112 to undertake the joining process and the registration process.

If the spoke 26 looses communication with the hub 22 so that the spoke 26 cannot communicate with the spectrum management system 12 through the hub 22, the operation of the spoke 26 may return to block 112. In one embodiment, loss of communication with the hub 22 may be monitored by periodically scanning for the beacon from the hub 22. If the grant that was received in block 128 expires, the operation of the spoke 26 may return to block 112 or block 120. Also, instead of returning to block 120 after block 136 or after a positive determination in block 132, the operation of the spoke 26 may return to block 112.

D. EXAMPLES

The spectrum management techniques described in this document may be applied to the management of spectrum in whitespace communication systems 10, such as radio devices that operate using TV whitespace In addition, the techniques may be applied to communications systems 10 in which radios that use licensed spectrum are present and radios that use unlicensed spectrum are present.

A specific example of the spectrum management techniques to a network will be described. It will be appreciated that the following example is for illustrative purposes and the techniques may be applied to other networks and/or in other manners.

The example is directed to management of radio devices operating in 5.4 GHz frequencies. For instance, astronautics, aeronautic, and weather devices operate in radar frequencies that share spectrum with IEEE 802.11x devices that operate in the 5.4 GHz bands. According to FCC and ETSI regulations, a 802.11x radio device is required to "back off" its operating channel if the device detects a radar signal for a predetermined duration of time. It is operationally complicated to have the 802.11x radio device monitor the channel and adhere to these regulations. Additionally, the accuracy of monitoring is low since multi-path false synchronization may lead to false radar detection. As a result, unneeded down time of at least a portion of the 802.11x network may be experienced. In addition, passing information across distributed network nodes in a timely fashion is difficult and complex.

This situation could be more effectively managed using the spectrum management system 12 instead of locally at the 802.11x radio devices. For instance, the spectrum management system 12 may track radar signal generators, including the duration and channel of operation. In appropriate circumstances, the spectrum management system 12 may command the unlicensed 802.11x devices to move to a different channel. This may be accomplished, for example, by generating a positive result in blocks 62 and 98 for all effected hubs 22 and spokes 26, and transmitting channel revocations to the effected hubs 22 and spokes 26. This will lead to the hubs 22 and spokes 26, including subordinate mode I spokes that stop receiving a beacon from the associated hub 22, to register for a different spectrum allocation. In one embodiment, the spectrum management system 12 may temporarily allocate licensed spectrum to the impacted radio devices 20.

In one embodiment, the channel revocations completely revoke the spectrum allocation of the hubs 22 and spokes 26, thereby forcing registration of these devices. In another embodiment, the channel revocation may be a partial revocation. This may be in the form of an amendment to the channel map transmitted in block 52 or 88 where the amendment removes one or more channels from the channel map. In this case, the effected radio devices may select a different channel from the current channel map.

E. Conclusion

Although certain embodiments have been shown and described, it is understood that equivalents and modifications falling within the scope of the appended claims will occur to others who are skilled in the art upon the reading and understanding of this specification.

What is claimed is:

1. A method of radio communications using a hub radio device that forms part of a communication system, the communication system having a spectrum management system that allocates spectrum to radio devices in the communication system, comprising the following steps carried out by the hub radio device:
   registering with the spectrum management system and receiving a spectrum allocation for the hub radio device from the spectrum management system, the spectrum allocation for the hub radio device identifying available operating channels for the hub radio device;
   forming a network on one of the operating channels identified in the spectrum allocation for the hub radio device;
   broadcasting a beacon over an operating channel that is identified in the spectrum allocation for the hub radio device;
   joining into the network a spoke radio device from which a join request is received; and
   acting as a communication pathway for communication between the spoke radio device and the spectrum management system for the spoke radio device to register with the spectrum management system and to receive a spectrum allocation for the spoke radio device from the spectrum management system, the spectrum allocation for the spoke radio device identifying available operating channels for the spoke radio device and being a separate spectrum allocation than the spectrum allocation for the hub radio device; and
   wherein the beacon contains data regarding the spectrum management system, the data distinguishing the spectrum management system from other spectrum management systems that provide spectrum allocations to radio devices.

2. The method of claim 1, wherein the operating channel on which the network is formed is selected by the hub radio device from plural channels in the spectrum allocation for the hub radio device.

3. The method of claim 2, wherein the selected operating channel is a whitespace channel and the spectrum allocation for the hub radio device is a channel map of available whitespace channels.

4. The method of claim 2, further comprising communicating the operating channel selection to the spectrum management system.

5. The method of claim 1, wherein the hub radio device is a fixed radio device or a mode II radio device.

6. The method of claim 1, further comprising the hub registering again with the spectrum management system if the registration of the hub expires.

7. The method of claim 1, wherein the joining includes receiving a join request from the spoke radio device and transmitting a join grant to the spoke radio device.

8. The method of claim 1, further comprising receiving a command from the spectrum management system to cease communication over the operating channel, discontinuing communication over the operating channel, and seeking a new spectrum allocation from the spectrum management system.

9. The method of claim 8, wherein the command is one of a channel revocation or a deregistration.

10. A method of radio communications using a spoke radio device that forms part of a communication system, the communication system having a spectrum management system that allocates spectrum to radio devices in the communication system, comprising the following steps carried out by the spoke radio device:
scanning for and receiving a beacon that is broadcast by a hub radio device, the hub radio device being registered with the spectrum management system and operating on a network formed by the hub radio device on a channel identified in a spectrum allocation provided to the hub radio device from the spectrum management system;
joining the network formed by the hub radio device; and
registering with the spectrum management system and receiving a spectrum allocation for the spoke radio device from the spectrum management system, messages to carry out the registering and receiving the spectrum allocation are transmitted via the hub radio device as a communication pathway for communication between the spoke radio device and the spectrum management system, and the spectrum allocation for the spoke radio device identifying available operating channels for the spoke radio device and being a separate spectrum allocation than the spectrum allocation for the hub radio device; and
wherein beacons are received from plural hub radio devices and each beacon contains data regarding a spectrum management system associated with the respective hub radio system, the data in each beacon distinguishing the respective spectrum management system from other spectrum management systems that provide spectrum allocations to radio devices; and
the method further comprising selecting a network of one hub radio device to loin from the plural hub radio systems according to a preferred one of the spectrum management systems.

11. The method of claim 10, further comprising the spoke radio device establishing a network separate from the network formed by the hub radio device, the network established by the spoke radio device on an operating channel that is identified in the spectrum allocation for the spoke radio device and conducting wireless communications over the network established by the spoke radio device with another radio device.

12. The method of claim 11, further comprising the spoke radio device receiving a command from the spectrum management system to cease communication over the operating channel, discontinuing communication over the operating channel, and seeking a new spectrum allocation from the spectrum management system.

13. The method of claim 12, wherein the command is one of a channel revocation or a deregistration.

14. The method of claim 12, further comprising the spoke radio device selecting the operating channel for the network established by the spoke radio device from plural channels identified in the spectrum allocation for the spoke radio device.

15. The method of claim 14, wherein the selected operating channel is a whitespace channel and the spectrum allocation is a channel map of available whitespace channels.

16. The method of claim 14, further comprising communicating the operating channel selection to the spectrum management system.

17. The method of claim 10, wherein the spoke radio device is a fixed radio device or a mode II radio device.

18. The method of claim 10, further comprising the spoke radio device registering again with the spectrum management system if the registration expires.

19. The method of claim 10, wherein the spoke radio system is a mode I radio device.

20. The method of claim 1, wherein communication between the hub radio device and the spectrum management system, including communication between the spoke radio device and the spectrum management system for which the hub radio devices acts as a communication pathway, is by way of a network access device that operatively connects the hub radio device to the Internet independent of the channels identified in the spectrum allocation for the hub radio device, the spectrum management system being accessible via the Internet.

21. The method of claim 1, wherein the hub radio device and the spoke radio device each are whitespace radio devices, the spoke radio device is without an available communication pathway to the spectrum management system other than via another whitespace device.

22. The method of claim 10, wherein communication between the hub radio device and the spectrum management system, including communication between the spoke radio device and the spectrum management system for which the hub radio devices acts as a communication pathway, is by way of a network access device that operatively connects the hub radio device to the Internet independent of the channels identified in the spectrum allocation for the hub radio device, the spectrum management system being accessible via the Internet.

23. The method of claim 10, wherein the hub radio device and the spoke radio device each are whitespace radio devices, the spoke radio device is without an available communication pathway to the spectrum management system other than via another whitespace device.

* * * * *